United States Patent [19]

Eppley

[11] 4,251,816

[45] Feb. 17, 1981

[54] METHOD AND APPARATUS FOR PLOTTING GRAPHICS

[75] Inventor: Ricky L. Eppley, Dayton, Ohio

[73] Assignee: NCR Corporation, Dayton, Ohio

[21] Appl. No.: 972,177

[22] Filed: Dec. 21, 1978

[51] Int. Cl.[3] .......... G06F 3/14

[52] U.S. Cl. .......... 340/747; 340/722; 340/790; 340/751

[58] Field of Search .......... 340/706, 722, 790, 736, 340/739, 753, 747, 751

[56] References Cited

U.S. PATENT DOCUMENTS

| | | | |
|---|---|---|---|
| 3,459,926 | 8/1969 | Heilweil et al. | 340/739 |
| 3,510,634 | 5/1970 | Granberg et al. | 340/739 |
| 3,716,705 | 2/1973 | Newell | 340/736 |
| 3,731,299 | 5/1973 | Bouchard et al. | 340/739 |
| 3,772,677 | 11/1973 | Sommer | 340/739 |
| 3,781,850 | 12/1973 | Gicca et al. | 340/722 |
| 3,818,475 | 6/1974 | Hussey | 340/736 |
| 4,003,022 | 1/1977 | Takahashi et al. | 340/739 |
| 4,017,723 | 4/1977 | Fickes | 340/739 |
| 4,047,248 | 9/1977 | Lyman et al. | 340/739 |
| 4,053,740 | 10/1977 | Rosenthal | 340/725 |
| 4,056,713 | 11/1977 | Quinn | 340/742 |
| 4,074,359 | 2/1978 | Hasenbalg | 340/739 |
| 4,075,620 | 2/1978 | Passavant | 340/750 |

*Primary Examiner*—Marshall M. Curtis
*Attorney, Agent, or Firm*—J. T. Cavender; Albert L. Sessler, Jr.; Elmer Wargo

[57] ABSTRACT

A method and apparatus for plotting graphics or images such as arrows and grids, for example, on a display device such as a cathode ray tube (CRT) screen. The method includes generating a plotting string for the image to be displayed, with the plotting string including a repeat factor and a control factor for each segment of the image to be displayed, with the repeat factor containing the number of times a plotting character is to be repeated to produce the length of an associated segment in the image, and with the control factor containing x and y offsets for the associated segment. The method also includes utilizing the associated control factor to establish direction along x and y coordinates on the screen of the CRT for a segment in the image, and utilizing the associated repeat factor to determine the number of times the plotting character is to be repeated on the screen along a line established by the associated control factor to thereby produce the length of the associated segment. This process is repeated for each of the segments in the image.

2 Claims, 17 Drawing Figures

TPC BIT DESCRIPTION TABLE

FIG. 4A

| TPC | Bit Mask | Mask Value | Meaning |
|---|---|---|---|
| TPC1 | 80H | - | Parity |
| | 7FH | 28H,29H,2AH,2BH | Device ID (CRT display driver 34 uses 28H) |
| TPC2 | 80H | - | Parity |
| | 40H | 40H | Always 40H to avoid control sticks |
| | 20H | 00H | Always zero |
| | 1FH | 00H-1FH | X cursor position |
| TPC3 | 80H | - | Parity |
| | 40H | 40H | Always 40H to avoid control sticks |
| | 30H | 00H | Always zero |
| | 0FH | 00H-0FH | Y cursor position |
| TPC4 | 80H | - | Parity |
| | 40H | 40H | Always 40H to avoid control sticks |
| | 20H | 00H | Enable CRT Display 12 |
| | | 20H | Disable CRT Display 12 |
| | 10H | 00H | Do not blink data |
| | | 10H | Blink data |
| | 08H | 00H | Do not underline data |
| | | 08H | Underline data |
| | 04H | 00H | NOP |
| | | 04H | Erase a line |
| | 02H | 00H | NOP |
| | | 02H | Erase screen of CRT Display 12 |
| | 01H | 00H | Always zero |
| TPC5 | 80H | - | Parity |
| | 40H | 40H | Always 40H to avoid control sticks |
| | 30H | 00H | Use no prestored data |
| | | 10H | Use prestored data |
| | | 20H | Use prestored TPC string |
| | | 30H | Never occurs (undefined) |
| | 08H | 00H | Literal data |
| | | 08H | Plotting data |
| | 04H | 00H | No substitute character (numeric entry) |

FIG. 4B

| TPC | Bit Mask | Mask Value | Meaning |
|---|---|---|---|
| | | 04H | Substitute character (numeric entry) |
| | 03H | 00H | Total disable of keyboard 70 entry |
| | | 01H | Use keyboard entry format 1 |
| | | 02H | Use keyboard entry format 2 |
| | | 03H | Use keyboard entry format 3 |
| TPC6 | 80H | - | Parity |
| | 40H | 40H | Always 40H to avoid control sticks |
| | 30H | 00H | Always zero |
| | 0FH | 00H-0FH | Buffer slot number |

FIG. 6

| | TPC4 | |
|---|---|---|
| | HEX DIGIT | HEX DIGIT |
| TPC4 VALUE | 0 0 1 0 | X X X X |
| BIT MASK | 0 0 1 0 | 0 0 0 0 |
| | | |
| MASK VALUE - 20H (DISABLE CRT DISPLAY 12) | 0 0 1 0 | 0 0 0 0 |

FIG. 7

| | TPC4 | |
|---|---|---|
| | HEX DIGIT | HEX DIGIT |
| TPC4 VALUE | 0 0 0 0 | X X X X |
| BIT MASK | 0 0 1 0 | 0 0 0 0 |
| | | |
| MASK VALUE - 00H (ENABLE CRT DISPLAY 12) | 0 0 0 0 | 0 0 0 0 |

PLOTTING ROUTINE 36

FIG. 11

Bit Description Table For Repeat And Control Words

| Character or Word | Bit Mask | Mask Value | Meaning |
|---|---|---|---|
| Repeat | 80H | - | Parity |
| | 40H | 40H | Always 40H to avoid control sticks |
| | 3FH | 01H-3FH | # of characters in a graphic segment (00H corresponds to 40H) |
| Control | 40H | 40H | Always 40H to avoid control sticks |
| | 20H | 00H | Y directional offset is down |
| | | 20H | Y directional offset is up |
| | 10H | 00H | X directional offset is to the right |
| | | 10H | X directional offset is to the left |
| | 0CH | - | Absolute Y directional offset,this value is rotated right twice to produce a value of 0 to 3 |
| | 03H | - | Absolute X directional off-set with a range of 0 to 3 |

FIG. 12A

PLOTTING ROUTINE 36

```
RELATIVE   ACTUAL
MEMORY     MACHINE
LOCATION   CODE                INSTRUCTION  OPERAND    COMMENTS

                     ; REGISTER USE
                     ; A - SCRATCH PAD
                     ; B - COUNTER (ZERO AT EXIT)
                     ; C - SCRATCH PAD
                     ; D - X CURSOR POSITION (UPDATED BY H DURING EXECUTION)
                     ; E - Y CURSOR POSITION (UPDATED BY L DURING EXECUTION)
                     ; H - X CURSOR DIRECTIONAL OFFSET (UNCHANGED AT EXIT)
                     ; L - Y CURSOR DIRECTIONAL OFFSET (UNCHANGED AT EXIT)

02A1       3E00      FCRTF0:   MVI     A,FCRTD3   ; LOAD PORT OFFSET
02A3       0E02                MVI     C,02H      ; SET DISABLE VALUE
02A5       CD8303              CALL    FCROUT     ; DISABLE VIDEO
02A8       4A        FCRTF1:   MOV     C,D        ; LOAD X CURSOR POSITION
02A9       3E00                MVI     A,FCRTD5   ; LOAD X CURSOR PORT OFFSET
02AB       CD8303              CALL    FCROUT     ; WRITE X CURSOR
02AE       4B                  MOV     C,E        ; LOAD Y CURSOR POSITION
02AF       3E00                MVI     A,FCRTD6   ; LOAD Y CURSOR PORT OFFSET
02B1       CD8303              CALL    FCROUT     ; WRITE Y CURSOR
02B4       3A0200              LDA     FCRTBL     ; LOAD BLINK CONTROL CHARACTER
02B7       4F                  MOV     C,A        ; MOV TO REG C FOR OUTPUT
02B8       3E00                MVI     A,FCRTD2   ; LOAD PORT OFFSET
02BA       CD8303              CALL    FCROUT     ; WRITE CONTROL CHARACTER
02BD       3A2A00    FCRTF2:   LDA     FDSCHR     ; LOAD CHARACTER
02C0       4F                  MOV     C,A        ; LOAD C WITH CHARACTER
02C1       3E00                MVI     A,FCRTD1   ; LOAD CHARACTER PORT OFFSET
02C3       CD8303              CALL    FCROUT     ; OUTPUT A CHARACTER
02C6       05                  DCR     B          ; DECREMENT COUNTER
02C7       C8                  RZ                 ; DONE WITH THIS SECTION↓
```

FIG. 12B

```
RELATIVE   ACTUAL
MEMORY     MACHINE
LOCATION   CODE                 INSTRUCTION  OPERAND   COMMENTS

02C8       7A                   MOV          A,D       ; GET X POSITION
02C9       84                   ADD          H         ; ADD DIRECTIONAL OFFSET
02CA       E61F                 ANI          1FH       ; 5 BITS ONLY
02CC       57                   MOV          D,A       ; RESET X POSITION
02CD       7B                   MOV          A,E       ; GET Y POSITION
02CE       85                   ADD          L         ; ADD DIRECTIONAL OFFSET
02CF       E60F                 ANI          0FH       ; 4 BITS ONLY
02D1       5F                   MOV          E,A       ; RESET Y POSITION
02D2       C3A802               JMP          FCRTF1    ; GO BACK FOR MORE
                     ;
                     ; PLOTTING STRING HANDLER
                     ;
                     ; REGISTER USAGE
                     ; C - LENGTH OF STRING (MOD2 + 1, MINIMUM = 3) (ENTRY)
                     ; HL - POINTS TO PLOTTING STRING (ENTRY)
                     ; ALL OTHER REGISTERS SAME AS FIGURE OUTPUT ROUTINE
02D5       79        FCRTP0:    MOV          A,C       ; GET DLEN
02D6       FE03                 CPI          03H       ; LESS THAN 3 CHARACTERS↓
02D8       D8                   RC                     ; IF SO, RETURN
02D9       E5                   PUSH         H         ; SAVE HL
02DA       2A0000               LHLD         FCTPCY    ; LOAD X AND Y CURSOR POSITIONS
02DD       EB                   XCHG                   ; MOVE CURSOR POSITION TO DE
02DE       E1                   POP          H         ; RESET HL
02DF       7E                   MOV          A,M       ; LOAD CHARACTER
02E0       0D                   DCR          C         ; DEC DATA COUNTER
02E1       FE60                 CPI          60H       ; EUROPEAN CHARACTER
02E3       D2E802               JNC          FCRTP1    ; IF SO, JUMP
02E6       E600                 ANI          FCMASK    ; GET RID OF BIT 6
02E8       322A00    FCRTP1:    STA          FDSCHR    ; SET CHARACTER
02EB       23        FCRTP2:    INX          H         ; INC TO CHAR LENGTH (LEN)
```

FIG. 12C

| RELATIVE MEMORY LOCATION | ACTUAL MACHINE CODE | | INSTRUCTION | OPERAND | COMMENTS |
|---|---|---|---|---|---|
| 02EC | 7E | | MOV | A,M | ; GET LENGTH |
| 02ED | FE1F | | CPI | 1FH | ; UNIT SEPERATOR↓ |
| 02EF | C8 | | RZ | | ; IF SO, RETURN |
| 02F0 | E63F | | ANI | 3FH | ; USE 6 BITS ONLY |
| 02F2 | 3D | | DCR | A | ; DEC FOR CONVERSION (00H = 40H) |
| 02F3 | E63F | | ANI | 3FH | ; CLEAR HIGH ORDER BITS |
| 02F5 | 3C | | INR | A | ; FINISH CONVERSION |
| 02F6 | 47 | FCRTP3: | MOV | B,A | ; SET COUNTER |
| 02F7 | 23 | | INX | H | ; INC TO CNTL CHARACTER |
| 02F8 | 7E | | MOV | A,M | ; GET CNTL CHARACTER |
| 02F9 | E5 | | PUSH | H | ; SAVE HL |
| 02FA | C5 | | PUSH | B | ; SAVE BC |
| 02FB | D5 | FCRTCL: | PUSH | D | ; USE DE AS A SCRATCH PAD |
| 02FC | E603 | | ANI | 03H | ; GET ABSOLUTE X VALUE |
| 02FE | 4F | | MOV | C,A | ; SAVE ABSOLUTE VALUE |
| 02FF | 7E | | MOV | A,M | ; RELOAD CONTROL CHARACTER |
| 0300 | E610 | | ANI | 10H | ; NEGATE X ABSOLUTE VALUE↓ |
| 0302 | C42003 | | CNZ | FCRTNG | ; IF SO, DO IT |
| 0305 | 51 | | MOV | D,C | ; SAVE X DIRECTIONAL OFFSET |
| 0306 | 7E | | MOV | A,M | ; RELOAD CONTROL CHARACTER |
| 0307 | E60C | | ANI | 0CH | ; GET Y ABSOLUTE VALUE |
| 0309 | 0F | | RRC | | ; ROTATE TO |
| 030A | 0F | | RRC | | ; CORRECT BIT POSITIONS |
| 030B | 4F | | MOV | C,A | ; SAVE ABSOLUTE VALUE |
| 030C | 7E | | MOV | A,M | ; RELOAD CONTROL CHARACTER |
| 030D | E620 | | ANI | 20H | ; NEGATE Y ABSOLUTE VALUE↓ |
| 030F | C42003 | | CNZ | FCRTNG | ; IF SO, DO IT |
| 0312 | 59 | | MOV | E,C | ; SAVE Y DIRECTIONAL OFFSET |
| 0313 | EB | | XCHG | | ; SET HL FOR FIGURE OUTPUT ROUTINE |

FIG. 12D

| RELATIVE MEMORY LOCATION | ACTUAL MACHINE CODE | | INSTRUCTION | OPERAND | COMMENTS |
|---|---|---|---|---|---|
| 0314 | D1 | | POP | D | ; RESET DE |
| 0315 | CDA102 | | CALL | FCRTF0 | ; DISPLAY ALL/PART OF FIGURE |
| 0318 | C1 | | POP | B | ; RESET COUNTER |
| 0319 | E1 | | POP | H | ; RESET DATA ADDRESS |
| 031A | 0D | | DCR | C | ; DEC COUNTER |
| 031B | 0D | | DCR | C | ; DEC COUNTER |
| 031C | C8 | | RZ | | ; RETURN IF DONE |
| 031D | C3EB02 | | JMP | FCRTP2 | ; OTHERWISE GO BACK FOR MORE |
| 0320 | AF | FCRTNG: | XRA | A | ; CLEAR A |
| 0321 | 91 | | SUB | C | ; NEGATIVE REG C IN A |
| 0322 | 4F | | MOV | C,A | ; C = -C |
| 0323 | C9 | | RET | | |

METHOD AND APPARATUS FOR PLOTTING GRAPHICS

BACKGROUND OF THE INVENTION

This invention relates to a method and apparatus for plotting graphics such as arrows and grids on a display device such as a cathode ray tube (CRT) screen.

In certain user-type machines such as a cash dispensing machine, it is frequently necessary to provide an associated display device on which "lead-through" instructions are displayed to instruct a user of the machine as to how to operate the machine. Certain graphics such as grids and arrows, for example, are displayed on the display device so as facilitate the use of the machine, for example, an arrow may point to a location where cash requested from the machine will be dispensed. Frequently, the display device utilized is a CRT screen.

A typical cash dispensing machine generally has a microprocessor included therein to perform many routine functions associated with the machine; however, the machine and several others like it are generally coupled to and controlled by a host controller via transmission lines. In the past, some of the graphics to be formed on the display device of a machine were sent from the host controller, requiring both an extensive memory in the host controller and an extensive or long transmission time in sending the data for the graphics to the display device of a dispensing machine.

SUMMARY OF THE INVENTION

The method and apparatus of this invention reduce the transmission time and memory requirements necessary for plotting graphics on a display device such as a CRT screen compared to the prior art techniques previously described.

In general, the method for displaying a graphic or image on a display device having x and y coordinates therein is to generate a plotting string for the image to be displayed. The plotting string includes a character to be used for the display (like an asterisk) and also includes a repeat factor or word and a control factor or word for each segment in the image to be displayed. The repeat factor includes the number of times the character is to be repeated in any segment and the control factor includes the x and y offsets to provide direction for the associated segment. An initial cursor position is set on the display device (to locate the origin of the graphic) and a first character (like an asterisk) for the first segment of the graphic is displayed thereat. The x and y offsets for the first segment of the image or graphic are then added to the initial cursor position to generate a revised cursor position, and a second character of the first segment is then displayed thereat. The x and y offsets of the first segment are again added to the revised cursor position to produce a new revised cursor position, and the third character of the first segment is then displayed thereat. This process is repeated for the number of times indicated in the repeat factor for this first segment and thereafter, the process is repeated for the remaining segments in the entire image to be displayed.

BRIEF DESCRIPTION OF THE DRAWING

FIGS. 4A and 4B taken together comprise a table giving a description of the various TPC1–TPC6 codes shown in FIG. 3;

FIG. 6 is a chart showing how mask values are obtained from the various TPC codes and bit masks shown in FIGS. 4A and 4B to disable a CRT display shown in FIG. 1;

FIG. 7 is similar to FIG. 6, but shows the enabling of the CRT display shown in FIG. 1;

FIG. 11 is a bit description table for repeat and control words shown in the plotting string of FIG. 8; and FIGS. 12A, 12B, 12C, and 12D taken together comprise a detail program listing of the plotting routine shown in FIGS. 10A and 10B.

DETAILED DESCRIPTION OF THE INVENTION

Figure 1:
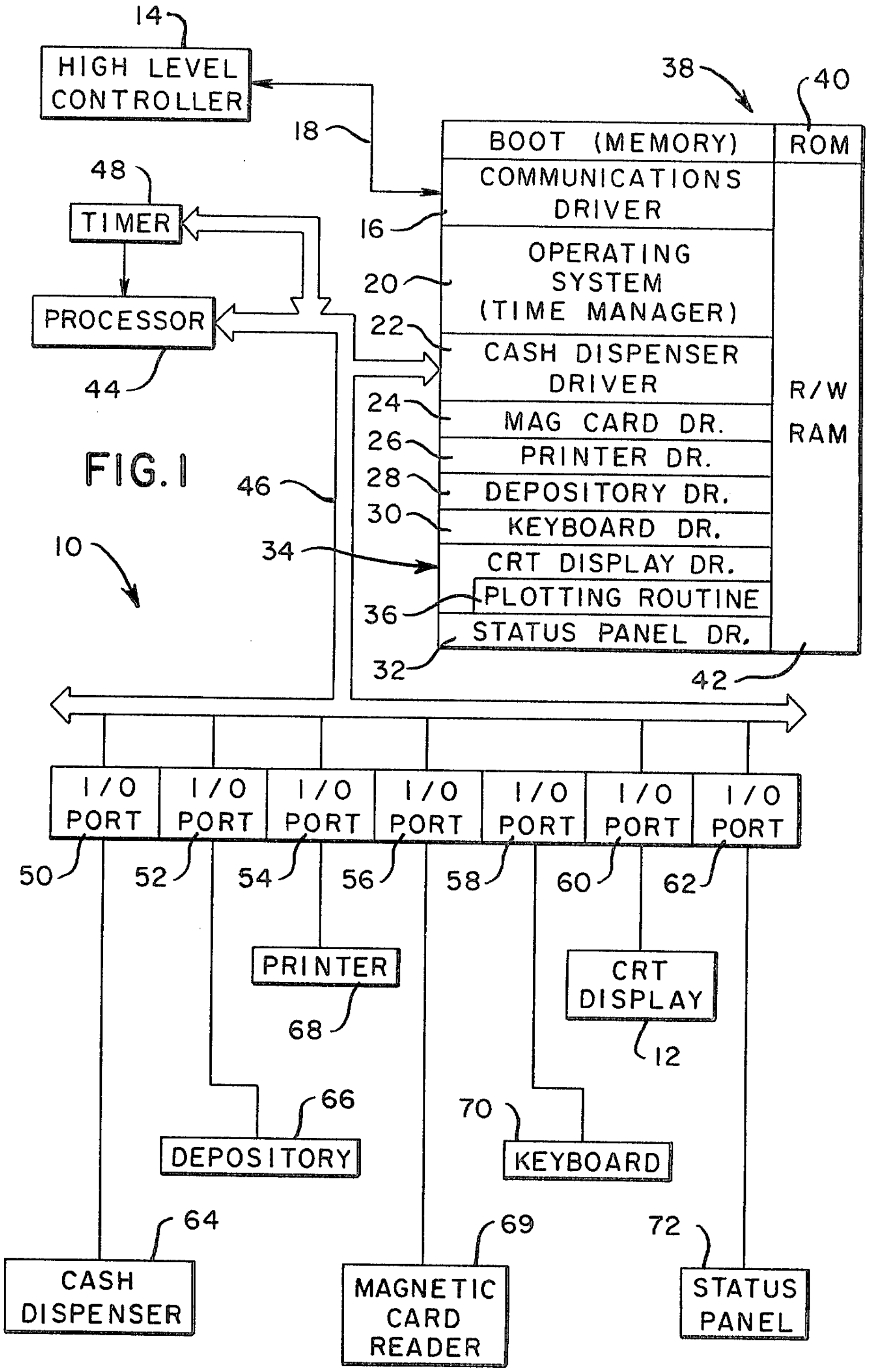
FIG. 1 is a general schematic diagram, in block form, of an apparatus which may be used with this invention.

FIG. 1 is a general schematic diagram in block form of an apparatus, designated generally as 10, with which this invention may be used. The apparatus 10 may, for example, be a transaction execution terminal or cash dispensing machine, as it is commonly called. The apparatus 10 includes a display device such as a CRT display 12 which has a display screen 76 (shown in FIG. 2) on which various "lead-through" instructions and graphics may be displayed to assist a user of the apparatus in the use of the apparatus 10 as previously described. The apparatus 10 includes a high level controller 14 which is connected to a communications driver 16 via a conventional four wire serial transmission line 18. The apparatus 10 also includes an operating system 20 including a conventional time manager shown in FIG. 1. The apparatus 10 also includes the cash dispenser driver 22, the magnetic card driver 24, the printer driver 26, the depository driver 28, the keyboard driver 30, the status panel driver 32 and a CRT display driver 34 which includes a plotting routine 36 which includes the method of this invention of plotting or displaying images on the CRT display 12. All the drivers mentioned are a part of a memory designated generally as 38, and this memory also includes a conventional ROM unit 40, and a conventional read/write RAM memory 42. The various drivers included in the memory 38 are interconnected to a general microprocessor 44 via a conventional tri-state bus 46 as shown in FIG. 1. A conventional timer 48 such as integrated circuit chip #8253 (manufactured by Intel) is also connected to the tri-state bus 46 and the processor 44.

The various drivers shown in memory 38 in FIG. 1 are connected to their associated hardware elements by a plurality of I/O ports 50 through 62 as shown. For example, the CRT display 12 is connected via the I/O port 60 and the tri-state bus 46 to the CRT display driver 34 as is conventionally done.

The physical apparatus with which this invention may be used is not shown in the drawing; however, the various elements associated with such an apparatus 10 are shown in block form in FIG. 1. These elements include a cash dispenser 64, a depository 66, a printer 68, a magnetic card reader 69, a keyboard 70, the CRT display 12 and a status panel 72. Because these elements are conventional, they need not be described in any further detail.

The method of generally using the transaction execution terminal (FIG. 1) is also conventional and need not be described in elaborate detail herein. The status panel 72 is connected through the I/O port 62, through the status panel driver 32, through the operating system 20, and through the communications driver 16 to the high level controller 14 to indicate the status of certain elements in the apparatus 10, (such as too few bills in associated storage hoppers, etc.) to a monitoring center (not shown) which may be located in a bank and monitored by bank personnel.

Before proceeding with a detailed discussion of the method of plotting graphics of this invention, it would appear appropriate to discuss the general functioning of the apparatus 10 in which this invention may be incorporated. The high level controller 14 shown in FIG. 1 performs routine initialization functions, and after this initialization is completed, a user of the apparatus 10 is requested by the CRT display 12 to insert his magnetic card into the magnetic card reader 69. The user then enters on the keyboard 70 a secret code peculiar only to him. The operating system 20, controlled by the high level controller 14, then performs a check on the authenticity of the magnetic card and the secret code entered by the user. Assuming that the magnetic card and the secret code are authentic, the CRT display 12 requests, for example, the amount of cash which the customer wishes to receive. The controller 14 then verifies the user's account to ascertain that there is a sufficient balance therein to enable the user to be dispensed the amount of cash which was requested. The operating system 20, under the control of the high level controller 14, then determines the number of low amount bills and high amount bills which are to be dispensed for the amount requested by the user, and, the dispensing of cash is effected by the cash dispenser 64 to a cash dispensing receptacle (not shown). An arrow designated generally as 74 (FIG. 2), appearing on the display screen 76 of the CRT display 12, points to the cash dispensing receptacle (not shown) to assist the user in the use of the apparatus 10. The arrow 74 appearing on the display screen 76 is an example of a graphic or image which may be formed by utilizing the plotting routine 36 of this invention.

The apparatus 10 is of the type which is commonly referred to as an interactive machine in that it relies on a central controller to control some of its activity. This invention is not necessarily limited to such an apparatus; however, it is convenient to discuss the invention in the framework of such an apparatus 10.

The high level controller 14 (FIG. 1) performs the function of the central controller referred to in the previous paragraph. One of the functions of the controller 14 as it relates to this invention is to indicate when an image is to be displayed on the CRT display 12 and to indicate the particular image to be displayed thereon. This function is performed by a message comprising a plurality of codes like TPC1 through TPC6 which is followed by a plotting string 78 shown only in a general format in FIG. 3. For example, in the preferred embodiment being described, the apparatus 10 is a cash dispensing machine, and in a typical transaction in which cash is dispensed, an application program associated with the controller 14 supplies the message comprising the TPC1–TPC6 codes and the plotting string 78 (FIG. 3) for displaying an arrow (like 74 in FIG. 2) for pointing to the location where the user is to receive the dispensed cash. The message comprising the TPC1–TPC6 codes and the plotting string 78 is sent serially over the communication line 18 from the controller 14 to the communications driver 16 (FIG. 1) and it is then stored in a particular location in the RAM memory 42. The operating system 20 (FIG. 1) decides from some of the TPC1–TPC6 codes that this particular message or command being discussed is one which is associated with the CRT display driver 34. The location of this message (FIG. 3) is forwarded to the operating system 20 and the CRT display driver 34, and thereafter control is given to the CRT display driver 34 to initiate the instructions contained in the message which is stored in the RAM memory 42. The CRT display driver 34 has a routine associated with it to interpret all the TPC1–TPC6 values and the plotting string data 78 contained therein. The CRT display driver 34 then utilizes the TPC1–TPC6 codes to control the functions to be performed by the CRT display 12. When the CRT display driver 34 gains control, it has access to the entire message shown in FIG. 3. If one of the TPC1–TPC6 codes indicates that an image is to be displayed on the CRT display 12, control is then turned over to the plotting routine 36 (FIG. 1).

Figure 3:
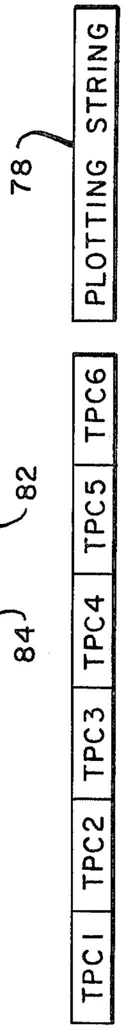
FIG. 3 is the general format of a message which is utilized by a plotting routine associated with the method of displaying images according to this invention.

Before discussing the plotting routine 36 (FIG. 1), it would be useful to discuss the particular nature of the message shown in FIG. 3 as it relates to the plotting routine 36.

Figure 5:
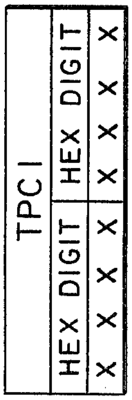
FIG. 5 shows the format of a typical TPC code.

The TPC1–TPC6 codes shown in FIG. 3 each have the format shown for TPC1 in FIG. 5. The TPC codes, like TPC1 (FIG. 5) are each eight bits in length, consisting of two four bit words written in hex code as shown. FIGS. 4A and 4B show a TPC bit description table for the TPC1–TPC6 codes. The various bit masks and mask values shown therein are given in hex code. "TPC" simply stands for terminal process character.

TPC1 is used to select one of the drivers shown in FIG. 1; for example, from FIG. 4A, a mask value of 28H will select the CRT display driver 34. The selection is effected by ANDING the particular TPC value with the bit mask shown in FIGS. 4A and 4B. For example, TPC4 and TPC5 contain commands which indicate how data is to be displayed on the CRT display 12. When the TPC4 value is 20H, as shown in FIG. 6, a bit mask of 20H (when ANDED to the TPC4 value of 20H) will produce a mask value of 20H. From FIG. 4A, a mask value of 20H for TPC4 means that the CRT display 12 is disabled. When the TPC4 value shown in FIG. 7 is ANDED with the bit mask of 20H, the resulting mask value of 00H is obtained, and from FIG. 4A, a mask value of 00H for a bit mask of 20H for TPC4 means that the CRT display 12 is enabled. This same selection technique is used for the TPC1–TPC6 codes shown in FIGS. 4A and 4B.

TPC2 is used to establish the initial cursor position in the x direction on the screen 76 (FIG. 2) of the CRT display 12. The screen 76 is divided into 32 locations or coordinates in the x direction and 16 locations or coordinates in the y direction in the embodiment described. TPC3 is similarly used to establish the origin or initial cursor position in the y direction on the screen 76. From FIG. 4A, a mask value of 00H to 1FH for TPC2 will produce 32 different cursor locations on the screen 76 in the x direction, and a mask value of 00H to OFH will produce 16 different cursor locations in the y direction.

As previously stated, TPC4 and TPC5 contain commands (FIGS. 4A & 4B) for the CRT display 12. The "enable-disable" feature with regard to the CRT display 12 has already been described with regard to TPC4. The TPC5 code contains the coding which is necessary to initiate the plotting routine 36 (FIG. 1) which is associated with the CRT display driver 34. From FIG. 4A, a mask value of 08H for TPC5 means that the plotting routine 36 is put into effect. The TPC1–TPC6 codes shown in the message in FIG. 3 need not have a plotting string 78 associated therewith as these codes are used for functions (within the apparatus 10) other than the plotting routine 36 (FIG. 1); however, when the plotting routine 36 is to be utilized, a mask value of 08H for TPC5 is necessary.

FIGS. 4A and 4B also contain bit masks and mask values for functions not directly associated with the plotting routine 36 (FIG. 1); however, they are included to provide background information for the apparatus 10. For example, mask values 01H, 02H, and 03H for the code TPC5 (FIG. 4B) relate to certain keyboard 70 entry formats not important to this invention. For TPC2–TPC6, the 40H value in the associated codes is always "on", which, when ANDED with the bit mask of 40H, produces a mask value of 40H; the reason for this is to avoid confusion with the communications driver 16 (FIG. 1). A mask value of 00H in FIGS. 4A & 4B means that that particular bit is unused.

As previously stated herein, when a message is to be displayed on the screen 76 of the CRT display 12, the associated message coming from the high level controller 14 (FIG. 1) would have the general format shown in FIG. 3, which message includes the TPC1–TPC6 codes and the plotting string 78.

Figure 8:
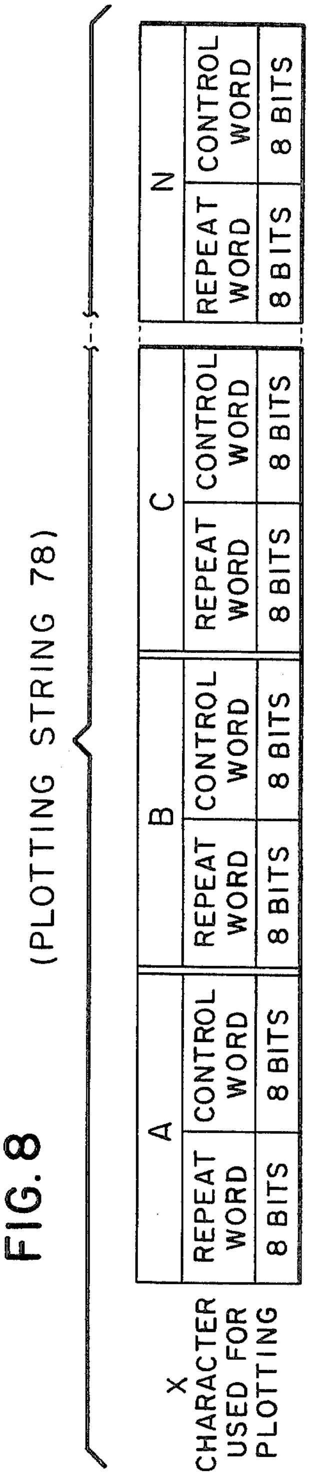
FIG. 8 shows more details of the plotting string shown in FIG. 3.

FIG. 8 shows the general format of the plotting string 78 which is utilized by the plotting routine 36 (FIG. 1) to form a graphic or image. The plotting string 78 (FIG. 8) includes a character such as the "X" shown or an asterisk or other character which is to be used for plotting the particular graphic on the screen 76 of the CRT display 12. The plotting string 78 also includes a plurality of pairs of control elements, each pair of control elements including a repeat factor or word and a control factor or word for each segment of the associated graphic, such as segments A, B, C . . . N shown in FIG. 8. The pairs of control elements lettered A, B, and C in FIG. 8 are associated with the segments lettered A, B, and C, for example, comprising the arrow 74 shown in FIG. 2.

Each pair of control elements, as, for example, the pair associated with segment A in FIG. 8, includes a repeat word and a control word. The repeat word includes a count (in hex form) which indicates the number of times the character (like X in FIG. 8) is to be repeated to thereby produce the length of the associated segment A shown in FIG. 2. The control word is an 8 bit word which is used to establish the direction of the associated segment (like segment A) although in the embodiment described herein, only six bits are actually used. Each control word has the format shown in FIG. 9. Two binary bits under the column 80, also marked X, establish the offset in an x direction and two binary bits under the column 82, also marked Y, establish the offset in a y direction with regard to the x and y coordinates of the screen 76 shown in FIG. 2. One binary bit under the column 84, also marked $S_x$, is used to indicate the direction of the offset in either a positive or negative direction with regard to the x axis, and similarly, one binary bit under the column 86, also marked $S_y$ is used to indicate the direction of the associated offset in either a positive or a negative direction. With regard to the x and y coordinates shown on the screen 76 (FIG. 2), a binary "1" for $S_y$ in column 86 indicates an "up" direction along the y axis and a binary "0" indicates a "down" direction along the y axis, and a binary "1" for $S_x$ in column 84 indicates a direction "to the left" along the x axis and a binary "0" indicates a direction "to the right" along the x axis. For the embodiment being described, the maximum offset movement in either the x or y directions is 3 units between adjacent characters being plotted, as only two bit positions exist under the columns 80 and 82, respectively; however, the principles employed in the plotting routine 36 could be extended to provide for different maximum offset movement if found necessary or desirable.

Figure 10A:
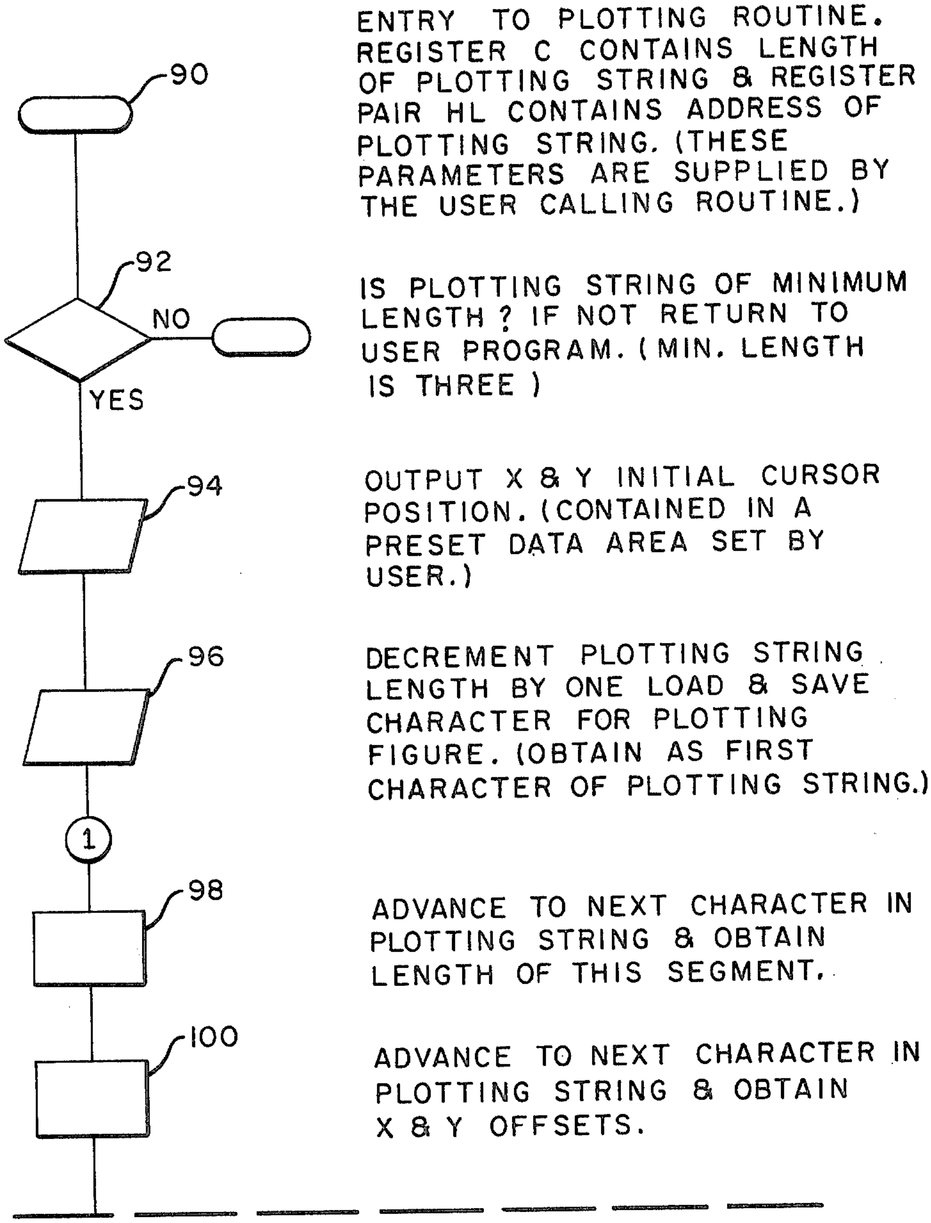
FIGS. 10A and 10B, taken together, represent a flow chart for the various steps included in the plotting routine shown in FIG. 1.
Figure 10B:
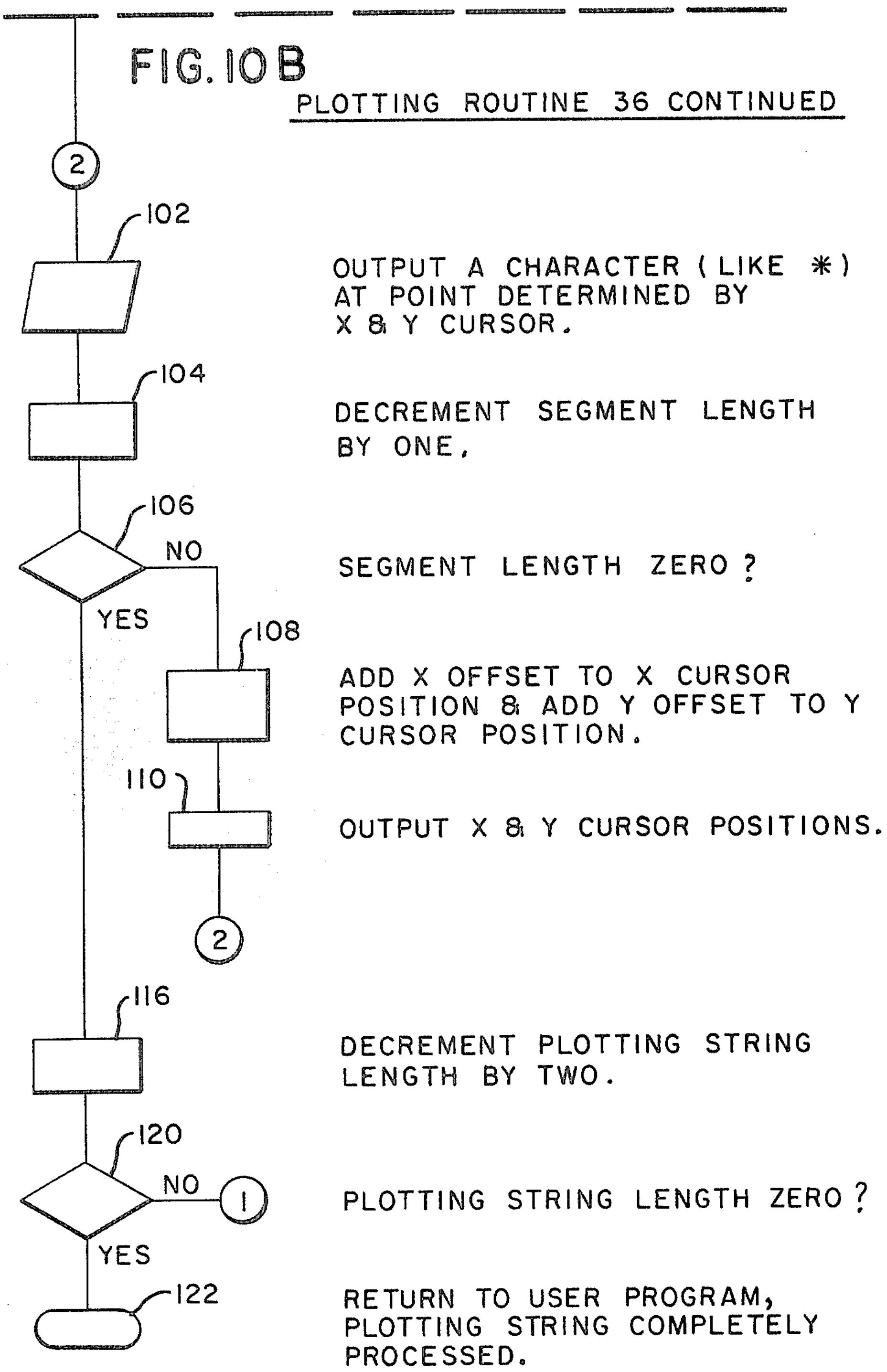

FIGS. 10A and 10B, taken together, represent a flow chart for the various steps included in the plotting routine 36. Step 90 in FIG. 10A indicates the entry of the plotting routine 36. In the embodiment being described, the particular processor 44 (FIG. 1) used with the plotting routine 36 is an Intel 8080 microprocessor, although the principles disclosed herein may be extended to other processors. Register C associated with the processor 44 contains the length of the plotting string 78 and the register pair HL contain the address (in RAM 42 in FIG. 1) of the plotting string. These parameters are supplied by the user calling routine which may be the high level controller 14. The length of the plotting string 78 is determined by counting the character used for plotting as one element and by counting the repeat word and the control word for an associated segment (like segment A in FIG. 8) as two elements. Consequently, the plotting string 78 must have a minimum length of 3 elements.

At step 92 in FIG. 10A, the length of the plotting string 78 is checked to determine whether or not it has the minimum length of 3. If not, control is returned to a user program. If the plotting string 78 has at least the minimum length of 3, the routine 36 proceeds to step 94.

At step 94 in FIG. 10A, the x and y coordinates for the initial cursor position is outputted. In effect, this initial cursor position is stored in a buffer (not shown) associated with the processor 44. It should be recalled that the initial cursor position is established by the TPC2 and TPC3 codes, respectively, in the message shown in FIG. 3. Thereafter, the count for the plotting string 78 is decremented by one in step 96, and the character to be used for plotting the associated graphic on the screen 76 is loaded in a register (associated with the processor 44) and saved.

Figure 9:
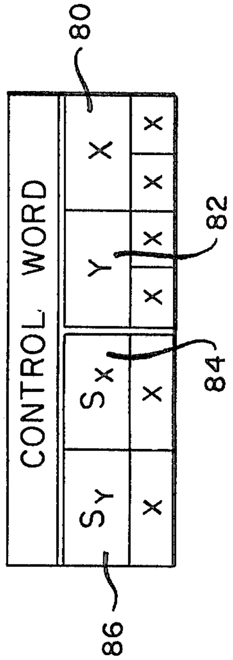
FIG. 9 shows more details of a control word included in the plotting string shown in FIG. 8.

At step 98 in FIG. 10A, the next character or repeat word from the plotting string 78 is obtained; this repeat word relates to the length of the associated segment as represented by the number of times the character (asterisk) is to be repeated for this segment, which, in this case, is segment A. At step 100 the next character or control word in the plotting string 78 is obtained; this word is the control word (as shown in FIG. 9) for segment A in the example being discussed, and it contains the x and y offsets for segment A.

At step 102 in FIG. 10B, the character selected for the graphic (like an asterisk) will be outputted at the x and y cursor position which, in the example being discussed, is actually the initial cursor position established by step 94 in FIG. 10A. At this time, the asterish 103 in FIG. 2 will be displayed on the CRT screen 76.

At step 104 in FIG. 10B, the length of the segment A is decremented by one. At step 106 the question, "Is the segment length zero?" is examined. In the example being described, the answer is "No", (as segment A has a length of three) and thereafter, the x and y offsets for segment A are added to the initial cursor position (from step 94) in step 108 to produce a revised cursor position which is stored in a buffer in step 110, and the routine 36 returns to step 102. At step 102, the second asterisk 112 (FIG. 2) is displayed on the screen 76, and the length of segment A is decremented by one in step 104. Because the segment length is not zero at this time, steps 108 and 110 are repeated to produce another revised cursor position which enables the third asterisk 114 in FIG. 2 to be displayed as a result of step 102. Step 104 is again repeated, and at step 106, the segment length for segment A will now be zero since its length is 3, and accordingly, the routine 36 proceeds to step 116.

Figure 2:
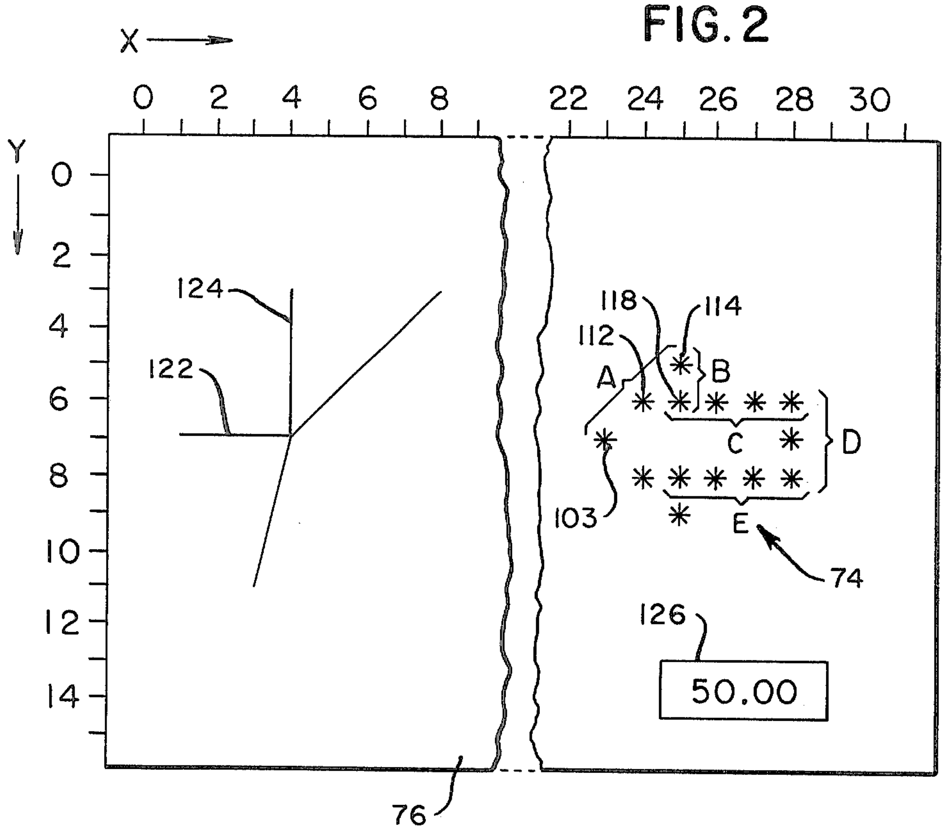
FIG. 2 is a schematic diagram showing the display screen of a cathode ray tube (CRT) with some graphics being shown on the screen.

At step 116 (FIG. 10B), the length of the plotting string 78 is decremented by two, with one count representing the repeat word for segment A and the second count representing the control word associated with segment A. In the example being described, the length of the plotting string 78 is not zero at this time, (as examined in step 120) as segments B, C, etc. have yet to be displayed; consequently, the plotting routine 36 returns to step 98 in FIG. 10A, at which step, the length of segment B is obtained. The x and y offsets from the control word for segment B are then obtained in step 100, and thereafter, the plotting routine 36 proceeds to step 102 in FIG. 10B. At step 102, the asterisk 114 (FIG. 2) is displayed again on the screen 76 because the x and y cursor position from step 110 which was stored in a buffer is used for the displaying of the first asterisk associated with segment B. In other words, the asterisk 114 is displayed as the last "character" of segment A and the first "character" of segment B. After displaying the asterisk 114 for segment B, the plotting routine 36 proceeds to step 104, at which step, the length of segment B is decremented by one. Because segment B has a length of two in the example being discussed, steps 106, 108, and 110 are repeated. At step 108, the x and y offsets for segment B are added algebraically to the revised cursor position which produced asterisk 114, to produce the change of direction for segment B as shown in FIG. 2, and when step 102 is repeated, an asterisk 118 will be displayed on the screen 76. The length of segment B will be decremented by 1 in step 104 (leaving a zero), and at step 106, a "Yes" response thereat will cause the plotting routine 36 to advance to step 116 at which step the length of the plotting string is decremented by two, i.e. one count for the repeat word and another count for the control word associated with segment B, thereby indicating the completion of segment B.

After the segment B is completed, the plotting routine 36 reverts back to step 98 (FIG. 10A) at which the length of segment C is obtained, and thereafter, the x and y offsets for segment C are obtained in step 100. When the plotting routine 36 proceeds to step 102 in FIG. 10B, a character (asterisk 118 in FIG. 2) will be outputted or repeated again as the x and y cursor positions stored in the buffer from the step 110 relate to asterisk 118 associated with the last character of segment B. Thereafter, length of segment C will be decremented by one in step 104, and steps 106, 108 and 110 will be repeated, as four asterisks are needed to complete segment C as shown in FIG. 2.

The process just described in relation to segments A and B will be repeated for segment C and the remaining segments in the graphic represented by arrow 74 in FIG. 2 until the entire arrow is completed. As each of the segments like C, D, etc. is completed the length of the plotting string 78 is decremented by two in step 120, until a zero value is arrived at in step 120, at which time the entire display, (arrow 74 in FIG. 2) is completed and the plotting routine 36 returns control to a user program in step 122.

The graph lines such as 122 and 124, for example, shown in FIG. 2 may also be produced by the plotting routine 36 just described in relation to the arrow 74 shown therein. The value of 50.00 shown in the block 126 in FIG. 2 was not produced by the plotting routine 36. However, a message such as that shown in FIG. 3, but not including the plotting string 78, was used to display the value of 50.00 shown in FIG. 2. A value associated with TPC5 in FIG. 3 is used to permit an entry made on the keyboard 70 (FIG. 1) to be displayed as the value of 50.00, for example, shown on the screen 76 in FIG. 2; however, because this technique is not important to this invention, it is not described in any further detail. It is mentioned merely to show how the plotting routine 36 for displaying graphics on the screen 76 (FIG. 2) is compatible with an existing CRT display driver 34 (FIG. 1) for displaying value amounts such as the 50.00 value shown in FIG. 2.

One method of utilizing the plotting routine 36 is to have the high level controller 14 (FIG. 1) supply the entire message (FIG. 3) including the various TPC1–TPC6 codes and the plotting string 78 as has already been described. Another method is to utilize a portion of the RAM memory 42 (FIG. 1) to store the plotting string 78 for messages or displays which are to be utilized frequently; when this is done, the TPC5 and TPC6 codes may be utilized. For example, from FIG. 4A, the mask value of 20H under TPC5 may be used to indicate that the pre-stored TPC string (including the plotting string 78) is to be used, and the particular memory location of the plotting string 78 is obtained in conjunction with the OOH–OFH mask values listed under TPC6 (FIG. 4B). The plotting routine 36 under each of these methods would operate in the same manner, as it is handled by the CRT display driver 34 (FIG. 1) by either method.

The actual hardware interface (not shown) between the CRT display driver 34 and the CRT associated with the screen 76 in FIG. 2 is conventional and does not form a part of this invention. The hardware interface has 8 input/output port addresses associated with it such as are used in an NCR display unit using a 06-123-STD, CCB1 processor board, for example manufactured by NCR Corporation. The CRT display driver 34 determines which of the 8 input/output ports is to be accessed for the various "write control character", "read/write x cursor", "read/write y cursor" functions, and the like utilized in displaying and sustaining an image such as arrow 74 in FIG. 2.

FIG. 11 is a bit description for the repeat and control words shown in the plotting string 78 of FIG. 8, and are used in a manner similar to that already described in relation to FIGS. 6 and 7.

FIGS. 12A–12D comprise a detail program listing for the plotting routine 36 shown in FIGS. 10A and 10B. The actual machine codes and instructions shown in FIGS. 12A–12D relate to an Intel 8080 processor in the embodiment described; however, the techniques employed herein may be extended to other processors. Definitions of the various machine codes and instructions may be obtained from, for example, a publication entitled, "Intel 8080 Microcomputer Systems User's Manual", which was published by Intel in 1975. The entry at memory location 02D5 on FIG. 12B, for example, corresponds to step 90 in FIG. 10B and represents the entry point for the plotting routine 36. The remaining portions of the detail program listing appear to be self-explanatory.

What is claimed is:

1. A method of displaying an image on a display device having x and y coordinates therein, in which the image is formed of a plurality of segments, with each said segment being formed of at least one character, comprising the following steps:

(a) generating a plotting string for the image to be displayed, with the plotting string having a length including a said character and also including a repeat factor and a control factor for each said segment of said image to be displayed, with said repeat factor containing the number of times said character is to be repeated to produce the length of the associated segment and with said control factor containing x and y offsets to establish direction and character intervals for the associated segment;

(b) storing a count representing the length of said plotting string and storing initial x and y coordinates for the start of said image;

(c) decrementing said count by one;

(d) obtaining the repeat factor of the first segment of said image to be displayed and the x and y offsets from its associated control factor;

(e) outputting a character at said initial x and y coordinates;

(f) decrementing said repeat factor for said first segment by one;

(g) adding the x and y offsets from the control factor for said first segment to said initial x and y coordinates to provide a revised cursor position for the second character of said first segment to be displayed;

(h) outputting a character at said revised cursor position;

(i) decrementing said repeat factor for said first segment by one;

(j) repeating said steps (g), (h), and (i) by adding the x and y offsets from the control factor for said first segment to the previous revised cursor position until said step (i) results in a count of zero;

(k) decrementing said count representing the length of said plotting string by two;

(l) repeating said step (d) for the next segment of said image to be displayed;

(m) repeating said steps (h), (i) and (j) for said next segment until said repeat factor therefor is zero;

(n) repeating said step (k) upon the completion of step (m); and (o) repeating said steps (m) and (n) for each of the remaining segments in said image until said count representing the length of said plotting string is equal to zero whereby for said next segment and for each of said remaining segments of said image, the last character of the immediately prior to said segment which was displayed is repeated as the first character of the segment to be displayed.

2. An apparatus for displaying an image on a display device having x and y coordinates therein in which said image is formed of a plurality of segments, comprising:

means for supplying a plotting string for the image to be displayed and also the number of segments in said image, with the plotting string including a plotting character and also including a repeat factor and a control factor for each said segment of the image to be displayed, said repeat factor containing the number of times said plotting character is to be repeated to form the associated segment, and said control factor containing x and y offsets for the associated segment to establish direction of the associated segment;

means for supplying x and y coordinates for an initial cursor position in said display device and for outputting a plotting character thereat;

means for adding the associated x and y offsets to said initial cursor position for the next plotting character in a first segment to be displayed to generate a revised cursor position and also for outputting a plotting character at said revised cursor position, whereby said first segment is completed by adding the associated x and y offsets to each prior revised cursor position and outputting a plotting character thereat until said number of times the plotting character is to be repeated has been completed, and whereby for each of the remaining segments of said image, the last character of the immediately prior segment which was displayed is repeated as the first character of the segment to be displayed;

means for counting said number of times a plotting character is repeated to signify the completion of a said segment when the associated number of times a plotting character is repeated equals the associated said repeat factor; and means for counting the number of segments which have been completed to signify the completion of said image when the number of segments which have been completed equals the number of segments in said image.

* * * * *